(12) United States Patent
Zhang et al.

(10) Patent No.: US 9,673,878 B1
(45) Date of Patent: Jun. 6, 2017

(54) SYSTEMS AND METHODS FOR PERFORMING PRECODING IN MULTI-USER SYSTEMS

(71) Applicant: Marvell International Ltd., Hamilton (BM)

(72) Inventors: Hongyuan Zhang, Fremont, CA (US); Yihong Qi, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 41 days.

(21) Appl. No.: 13/963,281

(22) Filed: Aug. 9, 2013

Related U.S. Application Data

(60) Provisional application No. 61/694,158, filed on Aug. 28, 2012.

(51) Int. Cl.
*H04B 7/02* (2006.01)
*H04L 1/02* (2006.01)
*H04B 7/0452* (2017.01)

(52) U.S. Cl.
CPC .................................. *H04B 7/0452* (2013.01)

(58) Field of Classification Search
None
See application file for complete search history.

(56) References Cited

U.S. PATENT DOCUMENTS

| | | | | |
|---|---|---|---|---|
| 6,504,506 B1* | 1/2003 | Thomas | ............... | H04B 7/0848 342/367 |
| 2007/0155336 A1* | 7/2007 | Nam | .................... | H04B 7/0408 455/69 |
| 2007/0281746 A1* | 12/2007 | Takano | ................ | H04B 7/0417 455/562.1 |
| 2008/0227495 A1* | 9/2008 | Kotecha | ............... | H04B 7/0417 455/562.1 |
| 2012/0057645 A1* | 3/2012 | Tesanovic | ............ | H04B 7/0417 375/267 |
| 2013/0064150 A1* | 3/2013 | Hirata et al. | .................. | 370/310 |

FOREIGN PATENT DOCUMENTS

| | | | | |
|---|---|---|---|---|
| JP | WO 2011152222 A1 | * | 12/2011 | ........... H04B 7/0665 |
| WO | WO 2011152222 A1 | * | 12/2011 | |

* cited by examiner

*Primary Examiner* — Wednel Cadeau

(57) ABSTRACT

Systems and methods are provided for precoding a signal at a transmitter. A plurality of receiver devices is identified, and a first receiver device is selected from the plurality of receiver devices. The transmitter communicates with the first receiver device over a channel, and an estimate of the channel is determined. A precoding matrix is computed based on the estimate, such that when the transmitter transmits a signal that is precoded with the precoding matrix over the channel, interference from a second receiver device of the plurality of receiver devices over the channel is reduced.

22 Claims, 8 Drawing Sheets

SYSTEMS AND METHODS FOR PERFORMING PRECODING IN MULTI-USER SYSTEMS

CROSS REFERENCE TO RELATED APPLICATION

This disclosure claims the benefit of U.S. Provisional Application No. 61/694,158, filed Aug. 28, 2012, which is hereby incorporated by reference herein in its entirety.

BACKGROUND

The present disclosure is directed to methods and apparatus for precoding a signal at a transmitter. Precoding supports transmission of multiple streams in a wireless communications system with multiple antennas. In multi-user multiple-input multiple-output (MUMIMO) systems, different data streams are intended for different receiving devices or different users. In general, if the transmitter has some information regarding the channel, the transmitter can make use of the known channel information to precode signals to be transmitted over the channel. Precoding involves applying different weights to the data streams such that some measure of the total throughput from the transmitter to the multiple receivers or users is increased or maximized.

SUMMARY

In accordance with an implementation of the disclosure, systems and methods are provided for precoding a signal at a transmitter. A plurality of receiver devices is identified, and a first receiver device is selected from the plurality of receiver devices. The transmitter communicates with the first receiver device over a channel, and an estimate of the channel is determined. A precoding matrix is computed based on the estimate, such that when the transmitter transmits a signal that is precoded with the precoding matrix over the channel, interference from a second receiver device of the plurality of receiver devices over the channel is reduced.

The estimate is a channel matrix, and the interference is reduced when the summation of the channel matrix multiplied by elements of the precoding matrix corresponding to a remainder of the plurality of receiver devices is zero, wherein the remainder includes the second receiver device. Each element in the precoding matrix corresponds to a receiver device in the plurality of receiver devices.

A method for computing the precoding matrix is determined based on a number of receiver devices in the plurality of receiver devices or based on a number of antennas associated with the plurality of receiver devices.

A nulling process is used to compute the precoding matrix when there are two receiver devices in the plurality of receiver devices. The nulling process comprises computing a projection matrix of a second receiver device, wherein the projection matrix is orthogonal to a channel matrix associated with the second receiver device. The nulling process further comprises computing a nulling matrix for the channel based on the projection matrix, computing a null channel matrix for the channel based on the nulling matrix, and computing an element of the precoding matrix based on the nulling matrix and the null channel matrix. In some embodiments, the nulling process comprises computing a nulling matrix by taking the difference between an identity matrix and a projection matrix of a second receiver device.

A transmit zero forcing process is used to compute the precoding matrix when there are more than two receiver devices in the plurality of receiver devices. The transmit zero forcing process comprises forming an overall channel matrix, each portion of the overall channel matrix corresponding to a channel matrix associated with a receiver device in the plurality of receiver devices, and computing a Hermitian matrix by multiplying the overall channel matrix by a Hermitian of the overall channel matrix.

The transmitter communicates with the second receiver device over a second channel, and the precoding matrix is computed such that when the transmitter transmits a signal that is precoded with the precoding matrix over the second channel, interference from the first receiver device over the second channel is reduced.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

This disclosure generally relates to performing precoding at a transmitter, such that a signal that is received by an intended receiving device is unaffected (or less affected) by the presence of interference from one or more other unintended receiving devices. For illustrative purposes, this disclosure is described in the context of a MUMIMO system with an intended transmission source (e.g., an access point or base station) that is meant to communicate with multiple receiving devices. The MUMIMO system may be used in accordance with wireless computer networking standards such as IEEE 802.11ac and wireless communication standards such as long-term evolution (LTE). The interfering source with respect to one of the receiving devices is described as the one or more other receiving devices. It should be understood, however, that this disclosure is applicable to any number of interfering sources in any multi-receiver system, and the interfering sources may result from any type of source, such as a different access point or base station, or another source generating interference signals.

MUMIMO systems may be used to improve link reliability and throughput in different environments. In downlink MUMIMO systems, an access point may simultaneously transmit data streams to different users. Applying precoding may further improve the system performance by reducing an amount of interference from one or more unintended receiving devices on a channel that is associated with an intended receiving device.

Figure 1:
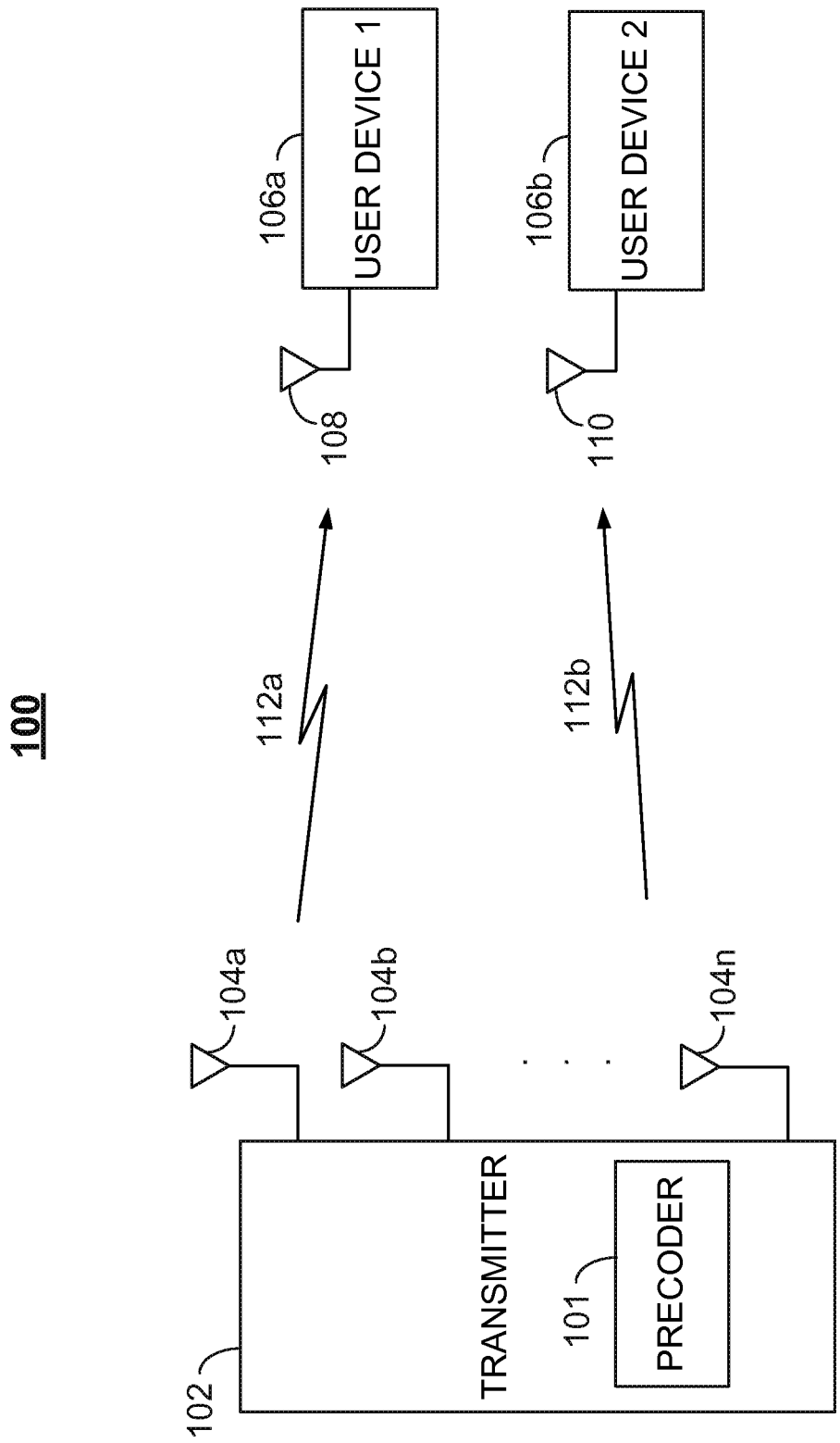
FIGS. 1, 2, and 3 are diagrams of illustrative multi-user systems, according to an embodiment of the present disclosure.
Figure 2:
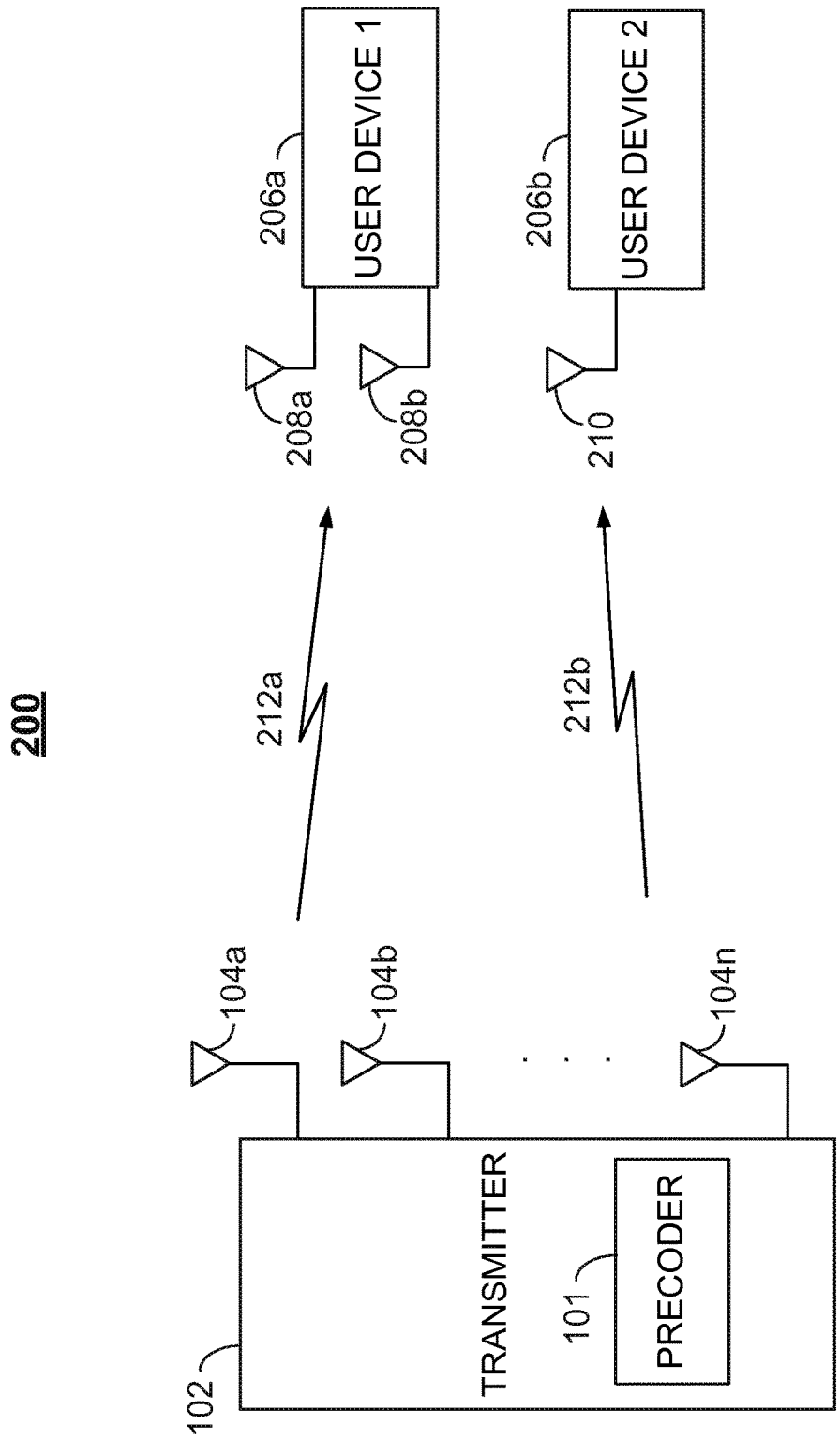
Figure 3:
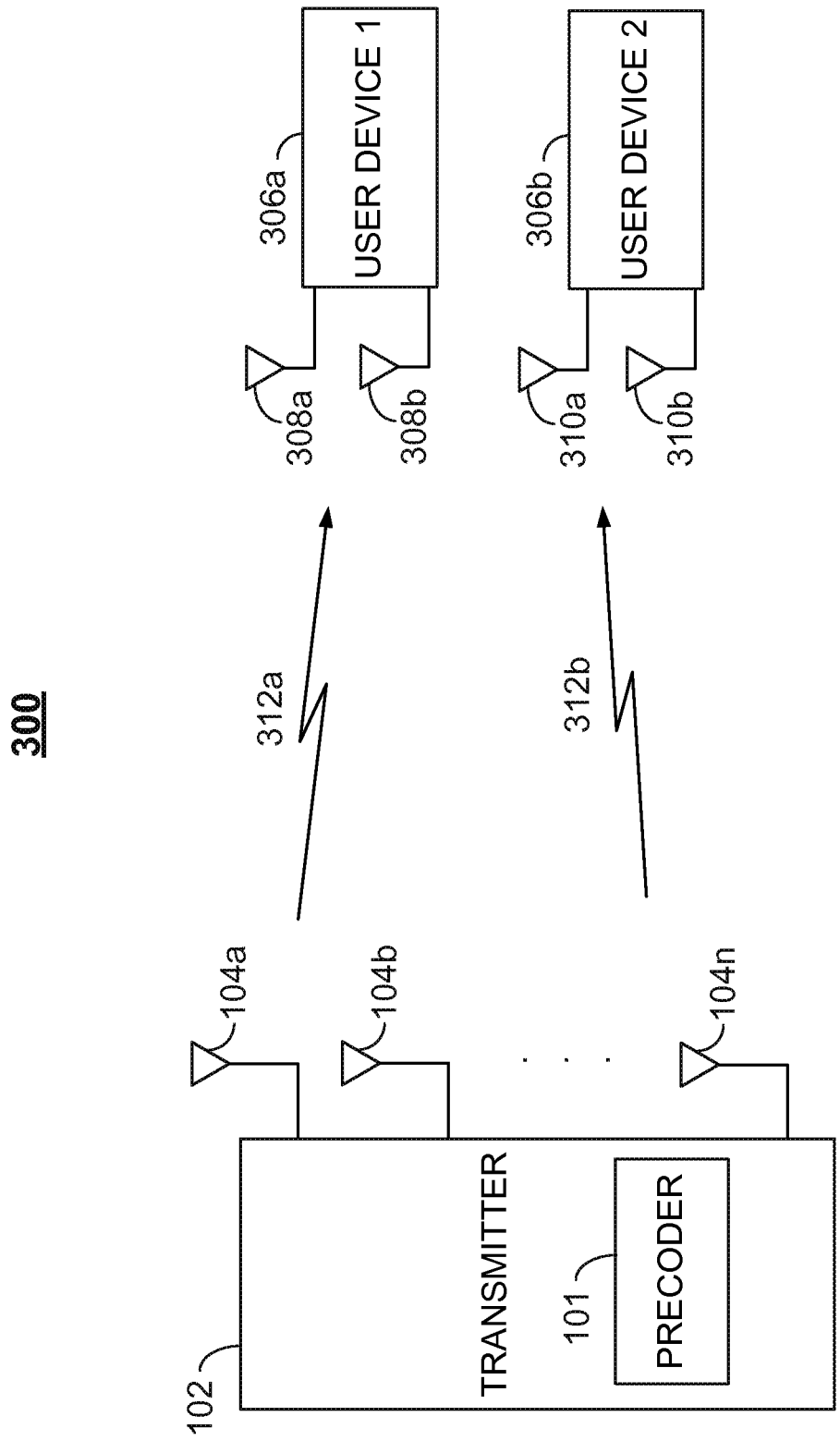

FIGS. 1-3 are diagrams of illustrative MUMIMO systems 100, 200, and 300, respectively, in accordance with an embodiment of the present disclosure. MUMIMO system 100 includes transmitter 102 and user devices 106a, 106b (generally, user device 106). Transmitter 102 may be an access point or a base station in a cellular environment that provides and receives data to/from user devices 106.

Transmitter 102 includes n antennas 104a-104n (generally, antenna 104), but in general, transmitter 102 may include any number of antennas 104 (typically two or more) to transmit a signal towards one or more user devices. For example, precoder 101 within transmitter 102 may be used to modify characteristics of signals provided to antennas 104 to adjust the transmission of the signals in a particular way. More specifically, when transmitting, a transmitter with multiple antennas 104 may control the phase and relative amplitude of the signal at each antenna of the transmitter in order to create a pattern of constructive and destructive interference in the wavefront generated by each antenna. This pattern of constructive and destructive interference shapes the beam (i.e., the wave) formed by the combination of the waves from each antenna and points the beam in a particular direction (e.g., towards user devices 106a, 106b).

User device 106 may be a cellular phone, PDA, mobile device, laptop, computing device, or any other suitable device used for communicating with transmitter 102. As shown in FIG. 1, user devices 106a, 106b each have one antenna (e.g., antenna 108 for user device 106a, and antenna 110 for user device 106b) for receiving the beam transmitted by transmitter 102. Depending on the location of user devices 106a, 106b, a signal intended to be received by one of the user devices 106 may interfere with a signal intended to be received by the other user device 106. Specifically, transmitter 102 communicates with user device 106a over channel 112a, and transmitter 102 communicates with user device 106b over channel 112b. The signal intended to be received by user device 106a may interfere with the signal that is intended to be received by user device 106b if a beam intended to be sent over channel 112a overlaps with a beam that is sent over channel 112b. Similarly, the signal that is intended to be received by user device 106b may interfere with the signal that is intended to be received by user device 106a. A user device intending to receive a signal is also generally referred to herein as a "receiving device", "receiver device", or "receiver".

In order to perform precoding, transmitter 102 may determine estimates of the channels associated with the intended receiving devices based on feedback from the receiving devices. In an example, the receiving devices compute estimates of the channels and provide the estimates to the transmitter in a feedback signal. The transmitter uses the feedback signal information to compute a precoding matrix and thereby adjusts the signal to be transmitted to compensate for any interference patterns across the different receiving devices. The feedback signal information may be provided to the transmitter using a procedure referred to as "explicit sounding" or another procedure referred to as "implicit sounding", both of which are described below.

In explicit sounding, transmitter 102 performs the channel estimation from various matrices that are fed back from the receiving devices. In particular, according to the 802.11ac standard, transmitter 102 sends a sounding packet (multicast) to the multiple receiving devices. The receiving devices, based on a channel estimation performed on the received sounding packet, provide explicit feedback in the form of matrices that may be used to derive the channel matrices. For example, the actual wireless channel for user u at the k-th subcarrier, $H_{k,u}$, may be expressed by singular value decomposition expression $H_{k,u}=U_{k,u}D_{k,u}V_{k,u}^{H}$, where $U_{k,u}$ is a left singular vector, $D_{k,u}$ is a diagonal matrix including the singular values of channel $H_{k,u}$, and $V_{k,u}^{H}$ is a Hermitian of a right singular vector. In explicit sounding, each of the receiving devices with user index u may provide the right singular vectors ($V_{k,u}$) and the singular values ($D_{k,u}$) for each channel k, and the transmitter 102 then re-constructs the channel matrix in k-th subcarrier as $H_{k,u}=D_{k,u}V_{k,u}^{H}$ for user device u. According to the expression for the reconstructed channel matrix, the left singular vectors $U_{k,u}$ may not be used for the purpose of computing a multiuser precoder.

In some embodiments of explicit sounding, the user device u derives the singular vectors $V_{k,u}$ and the singular values $D_{k,u}$ using singular value decomposition (SVD) of the channel estimation $H_{k,u}$ upon receiving the sounding packet. According to the 802.11ac standard, the singular values $D_{k,u}$ are fed back to the transmitter in the format of "per-tone SNR". In particular, instead of transmitting the singular values, each user device transmits the signal-to-noise ratio in each subcarrier (tone), which may be estimated by computing the magnitude square of singular values divided by noise power in each subcarrier.

In implicit sounding, transmitter 102 derives an estimate of the channel matrix $H_{k,u}$ for user device u at the k-th subcarrier directly by receiving a reverse link packet from user device u. In this case, the estimated channel matrices $H_{k,u}$ for all users are directly used for multiuser precoder computations, instead of being reconstructed via explicit feedback as in the explicit sounding scenario as described above.

It should be understood that although two user devices 106 are shown in FIGS. 1-3, any number of user devices 106 may be present. One or more user devices 106 may generate interfering signals that may affect the signal that is intended by transmitter 102.

As shown in FIG. 1, each user device 106a, 106b includes a single antenna 108, 110, respectively. However, in general, user devices 106 may include any number of antennas, including the same number or a different number of antennas. For example, system 200 of FIG. 2 is the same as system 100, including two user devices 206a, 206b that respectively communicate with transmitter 102 over two channels 212a, 212b. Similar to the user devices 106a, 106b in system 100, user device 206b of system 200 includes a single antenna 210. However, user device 206a of system 200 includes two antennas 208a, 208b. As another example, system 300 of FIG. 3 is the same as system 100, including two user devices 306a, 306b that respectively communicate with transmitter 102 over two channels 312a, 312b. However, in contrast to user devices 106a, 106b, both user devices 306a, 306b each include two antennas (antennas 308a, 308b for user device 306a, and antennas 310a, 310b for user device 306b).

It is generally desirable to equalize an effect of a channel between a transmitter and a receiver. One technique for equalizing an effect of the channel is to perform post-processing on the signal after the signal is received at a receiver, or the user device. For example, if the received signal is represented as y=Hx+n, the receiver may multiply the received signal y with the inverse of the channel $H^{-1}$, resulting in $H^{-1}y=x+H^{-1}n$. This technique may be referred to as receive zero forcing or zero forcing equalization, in which the receiving device performs post-processing on a received signal to equalize the effect of the channel. In accordance with an embodiment of the present disclosure, another technique for equalizing an effect of the channel is to perform precoding on the signal before the signal is transmitted at the transmitter.

In an example, in a simple system with one transmitter 102 and one user device 106, precoder 101 performs precoding on an intended signal x based on a channel matrix H. In particular, precoder 101 may precode the intended signal by multiplying a precoding matrix Q by the intended signal x before transmitting the signal over the channel to user device 106. The signal that is received by user device 106 may be written as y=HQx+n, where n is noise on the channel. If transmitter 102 has no information regarding n, or if transmitter 102 is not able to make use of information regarding n, it is desirable to design the precoding matrix Q to be equal to the inverse of the channel matrix, or $H^{-1}$. By setting the precoding matrix to the inverse of the channel matrix, the signal x is said to be "orthogonalized" as it is transmitted over the channel, and crosstalk between the receiver antennas is reduced or minimized. This process may be referred to as transmit zero forcing, null-steering, zero-forcing precoding, or beamforming, in which the transmitting device performs precoding on a desired signal to equalize the effect of the channel.

In more complex systems with multiple user devices 106 (MUMIMO systems, for example), the signal received by user u may be written as:

$$y_u = H_u Q_u x_u + H_u \sum_{k \neq u} Q_k x_k + n_u$$

$$= H_u [Q_1 Q_2 \ldots Q_K] \begin{bmatrix} x_1 \\ x_2 \\ \vdots \\ x_k \end{bmatrix} + n_u$$

$$= H_u Q_{MU} x + n_u, u = 1, 2, \ldots, K$$

where the precoding matrix $Q_{MU}$ includes precoding elements $Q_i$: $Q_{MU}=[Q_1 \ Q_2 \ \ldots \ Q_K]$, where each precoding element $Q_i$ is a vector or matrix that is multiplied by the signal $x_i$ for user i. The signal to be transmitted is denoted by:

$$x = \begin{bmatrix} x_1 \\ x_2 \\ \vdots \\ x_k \end{bmatrix}$$

A goal of the precoder 101 is to design the precoding matrix $Q_{MU}$ such that for each user device u, $H_u \sum_{k \neq u} Q_k x_k = 0$. This would ensure that the combined effect of the other user devices is cancelled for the user device u. Precoding techniques are described in more detail below in relation to FIGS. 4-7.

Figure 4:
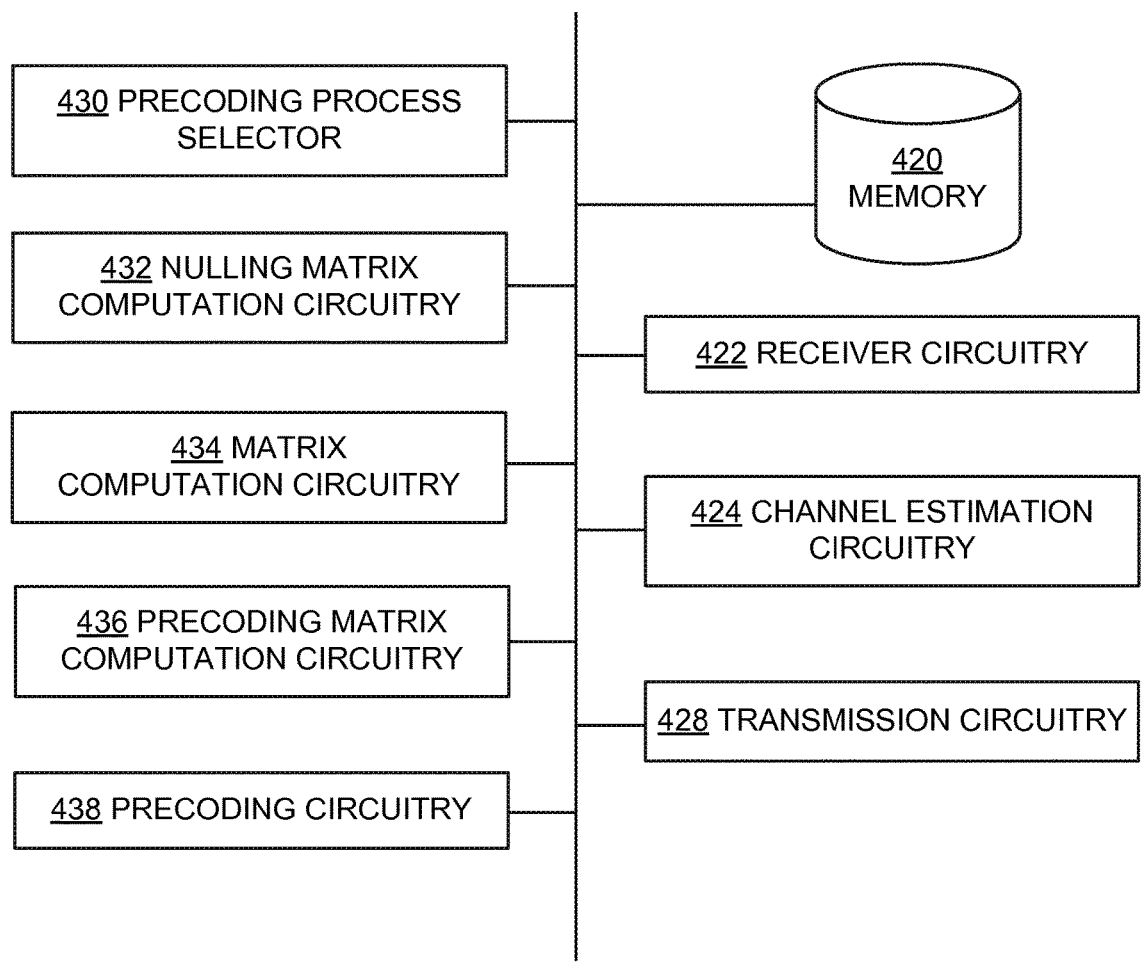
FIG. 4 is a diagram of an illustrative transmitter device, according to an embodiment of the present disclosure.

FIG. 4 is a block diagram 400 of an illustrative transmitter, such as transmitter 102, in accordance with an embodiment of the present disclosure. Diagram 400 includes a precoding process selector 430, a nulling matrix computation circuitry 432, a matrix computation circuitry 434, a precoding matrix computation circuitry 436, a precoding circuitry 438, a memory 420, a receiver circuitry 422, a channel estimation circuitry 424, and a transmission circuitry 428, all of which are connected over a bus.

Receiver circuitry 422 receives a signal from a user device such as user device 106, 206, or 306. In particular, receiver circuitry 422 may include an antenna such as antenna 104 that is configured to receive a signal over a channel such as channel 112a in FIG. 1. In some embodiments, antenna 104 is further configured to transmit a signal over the channel. The signal that is received by receiver circuitry 422 is used by channel estimation circuitry 424 to derive or determine an estimate of the channel. For example, in implicit sounding, the signal may include a direct estimate of the channel matrix H. In another example, in explicit sounding the transmitter may derive an estimate of the channel matrix using the explicit feedback of the singular vectors ($V_k$) and singular values ($D_k$) for each channel k, as described above.

When channel estimates from multiple users have been determined (either by explicit or implicit sounding), precoding process selector 430 selects an appropriate technique for precoding a signal to be sent over the channel. The intended signal to be precoded and transmitted may be accessed from memory 420. Matrix computation circuitry 434 may be configured to perform matrix computations, such as subtraction, addition, multiplication, matrix inversion, scaling (or normalization), Hermitians, or any other suitable matrix computation. Depending on the selected precoding technique, matrix computation circuitry 434 may be activated to perform any number of computations.

If a nulling technique is selected by precoding process selector 430, nulling matrix computation circuitry 432 may be used to compute a nulling matrix $Q_{Null}$ (described in detail in relation to FIG. 6), and matrix computation circuitry 434 may be used to multiply a Hermitian of a singular vector V (i.e., $V^H$) with the nulling matrix $Q_{Null}$ to obtain a null channel vector $h_{Null}$. Then, precoding matrix computation circuitry 436 is used to multiply the nulling matrix $Q_{Null}$ obtained by nulling matrix computation circuitry 432 with a Hermitian of the null channel vector $h_{Null}^H$ obtained by matrix computation circuitry 434. The product of the nulling matrix and the null channel vector is scaled to obtain the precoding matrix $Q_{MU}=\alpha Q_{Null} h_{Null}^H$.

Alternatively, if a transmit zero forcing technique is selected by precoding process selector 430, matrix computation circuitry 434 forms a Hermitian matrix B by multiplying the channel estimation matrix by the Hermitian of the channel estimation matrix ($B=HH^H$). Matrix computation circuitry 434 then computes or determines an inverse of the Hermitian matrix, and precoding matrix computation circuitry multiplies the Hermitian of the channel estimation matrix by the inverse of the Hermitian matrix to obtain the precoding matrix $Q_{MU}=H^H B^{-1}$.

In either case (nulling or transmit zero forcing), precoding circuitry 438 applies the precoding matrix to the intended signal to obtain a precoded signal, and transmission circuitry 428 transmits the precoded signal over an antenna such as antenna 104. Precoding techniques are described in more detail in relation to FIGS. 5-7.

Transmission circuitry 428 uses information provided by precoding circuitry 438 to modify one or more characteristics of the transmitted signal. For example, transmission circuitry 428 may change a phase, frequency, power or amplitude of the transmitted signal to compensate for the anticipated interference from other user devices. The resulting signal may be more accurately pointed towards a receiving device 106. Transmission circuitry 428 may be coupled to one or more antennas 104 (FIGS. 1-3). Transmission circuitry 428 may modulate and encode the precoded data. In some embodiments, transmission circuitry 428 shares circuitry used for downlink transmissions in an access point, base station, or transmission source.

In general, transmitter 102 may include a subset of the components shown in FIG. 4, or any of the shown components may be combined into a single component. Moreover, transmitter 102 may include additional components not shown in FIG. 4, such as beamforming circuitry or other components for computing an inverse of a matrix, for example.

Figure 5:
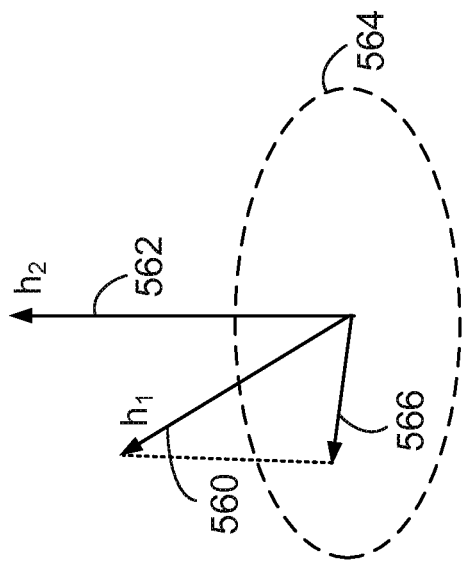
FIG. 5 is a diagram of illustrative channel vectors, according to an embodiment of the present disclosure.

FIG. 5 is a diagram 500 of an illustrative representation of a nulling technique, in accordance with an embodiment of the present disclosure. In particular, as described in relation to FIG. 4, if a nulling technique is selected by precoding process selector 430, nulling matrix computation circuitry 432 and matrix computation circuitry 434 are used to obtain a nulling matrix $Q_{Null}$ and a null channel vector $h_{Null}$. Then, precoding matrix computation circuitry 436 multiplies the nulling matrix $Q_{Null}$ with a Hermitian of the null channel vector $h_{Null}^H$, and scales the product to obtain the precoding matrix $Q_{MU} = \alpha Q_{Null} h_{Null}^H$. Channel vectors 560 and 562 are graphical representations of two channels $h_1$ and $h_2$. To determine the null channel vector for the channel $h_1$ (i.e., $h_{null1}$), the null space 564 of the channel $h_2$ is identified, and the channel $h_1$ is projected into the null space 564 to obtain the null channel vector 566, or $h_{null1}$. By projecting a first channel onto the null space of a second channel, transmitter 102 transmits a signal over the first channel that is not affected by any interference from the second channel because the transmitted signal is orthogonal to the second channel.

Figure 6:
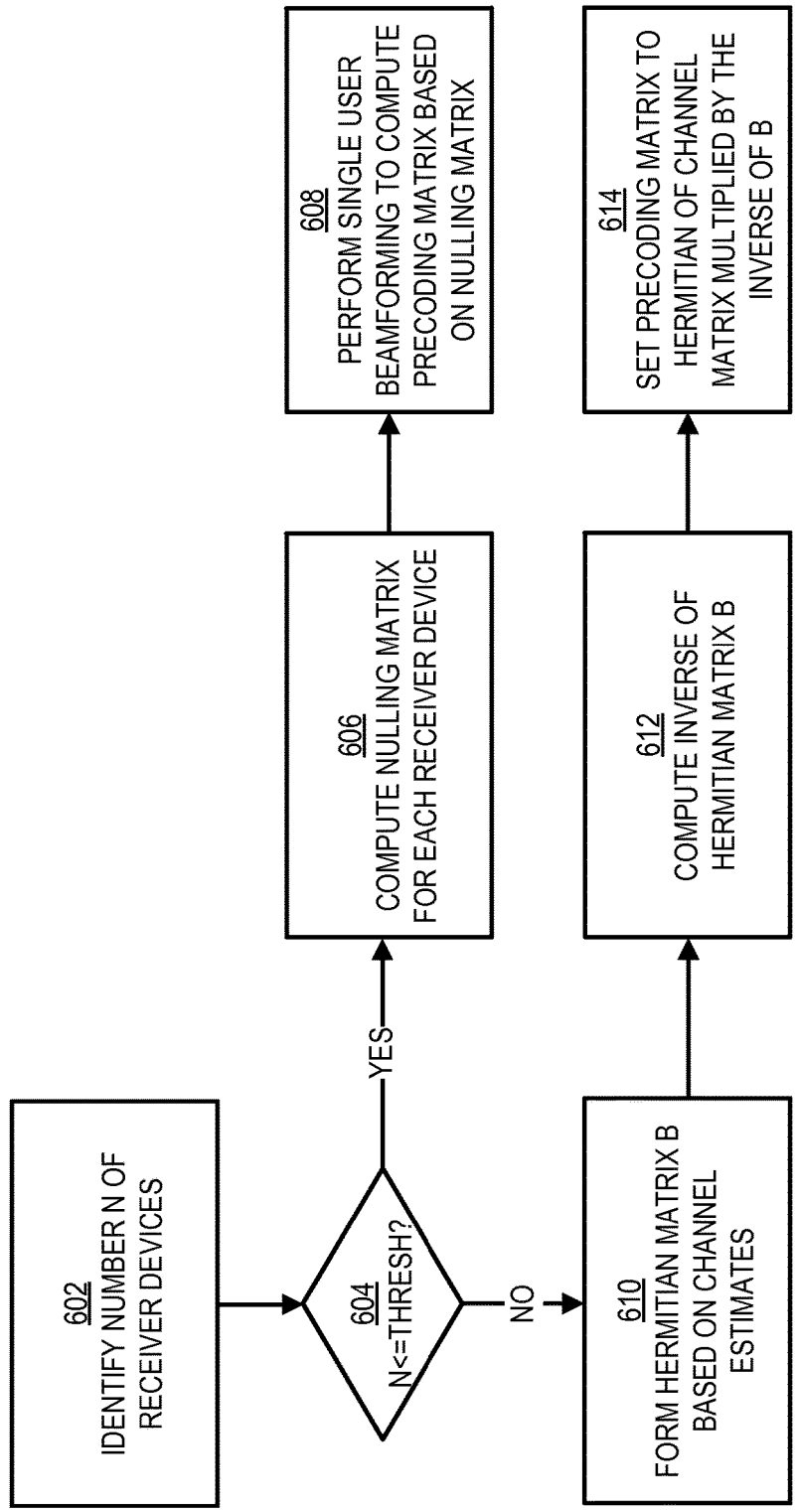
FIG. 6 illustrates a process for computing a precoding matrix using nulling or transmit zero forcing, according to an embodiment of the present disclosure.

FIG. 6 shows a flow diagram of a process 600 for determining a precoding matrix, in accordance with an embodiment of the present disclosure. Process 600 includes identifying a number N of receiver devices (602), and determining whether N is less than or equal to a threshold value (604). If so (i.e., N is small), then a nulling matrix is computed for each receiver device (606), and single user beamforming is performed to compute the precoding matrix based on the nulling matrix (608). Otherwise (i.e., N is large), then a Hermitian matrix B is formed based on channel estimates (610), an inverse of the Hermitian matrix B is computed (612), and the precoding matrix is set to the Hermitian of the channel matrix multiplied by the inverse of B (614).

At 602, a number N of receiver devices is identified. The number N is a number of user devices 106 that are configured to communicate with transmitter 102. The number N is compared to a predetermined threshold value at 604 to determine whether to use a nulling process or a transmit zero forcing process to determine the precoding matrix $Q_{MU}$. For example, the threshold value may be two, such that when there are two user devices 106, as shown in FIGS. 1, 2, and 3, a nulling process may be used. Nulling may be preferable to use for a small number of users because the computational complexity associated with nulling for two users may be simpler than other techniques. In general, nulling may be used when the number of user devices is below some threshold, which may be any suitable number. Similarly, nulling may be used when a number of antennas on the user devices is below some threshold.

As an example, for a simple case with two user devices with at most four receiver antennas, the transmitter may select to conduct nulling. In more complex cases, where there are more than two user devices, or where there are more than four receiver antennas, the transmitter may select to conduct transmit zero forcing. In general, a nulling process or a transmit zero forcing process may be selected based on a tradeoff between complexity and performance.

In general, an input to a precoding process may be channel estimation matrices, regardless of whether nulling or transmit zero forcing is selected. For example, the channel estimation matrices $H_1, \ldots, H_K$ may be obtained via direct estimation during implicit sounding. In another example, during explicit sounding, the channel estimation matrices may be indirectly derived from input singular vectors $V_k$ and the corresponding singular values $D_k$ for $k=1, \ldots, K$, by $H_1'=D_1V_1^H, H_2'=D_2V_2^H, \ldots, H_K'=D_KV_K^H$, for K receiver devices. Furthermore, even when the channel estimation matrices are directly estimated, the singular vectors $V_k$ and the corresponding singular values $D_k$ may be obtained via singular value decomposition, or SVD. Thus, without loss of generality, the inputs may be assumed to be $V_k$ and $D_k$.

If nulling is determined to be the appropriate technique for computing a precoding matrix, process 600 proceeds to 606 and 608 to execute a nulling technique. At 606, nulling matrix computation circuitry 432 computes a nulling matrix for each receiver device, and at 608, precoding matrix computation circuitry 436 computes the precoding matrix based on the nulling matrix. 606 and 608 are described in detail below in relation to the three examples shown in FIGS. 1-3.

When there are two user devices 106, each with a single antenna (as shown in FIG. 1), the inputs are the normalized vectors $V_1$ and $V_2$, which have size ($N_{TX} \times 1$, where $N_{TX}$ is a number of antennas on transmitter 102). Without loss of generality, the vectors $V_1$ and $V_2$ may or may not be normalized. Furthermore, for a user device 106 with a single antenna, the singular value $D_k$ is a 1×1 matrix, or a scalar. Then, the nulling matrix for each receiver device is computed at 606 as:

$$Q_{Null1} = I - V_2 V_2^H$$

$$Q_{Null2} = I - V_1 V_1^H$$

where I is the identity matrix, and each nulling matrix $Q_{Null}$ has size ($N_{TX} \times N_{TX}$). Computation of the nulling matrix is essentially illustrated in FIG. 5, where $V_2 V_2^H$ represents the projection matrix of the channel associated with the second user device.

Then, at 608, single user steering is performed to compute the precoding matrix based on the nulling matrix. In particular, a null channel vector $h_{Null}$ (with size ($1 \times N_{TX}$)) is computed as the product of the Hermitian of the singular vector and the nulling matrix:

$$h_{Null1} = V_1^H Q_{Null1}$$

$$h_{Null2} = V_2^H Q_{Null2}$$

Then, the precoding matrix is computed as the product of a scalar $\alpha_u$, the nulling matrix $Q_{Null}$, and the Hermitian of the null channel vector $h_{Null}^H$:

$$Q_{MU1} = \alpha_1 Q_{Null1} h_{Null1}^H$$

$$Q_{MU2} = \alpha_2 Q_{Null2} h_{Null2}^H$$

In particular, $Q_{MU1}$ and $Q_{MU2}$ each have size ($N_{TX} \times 1$), and $\alpha_u$ is a normalization factor that may be derived for ease of implementation. The normalization factor $\alpha_u$ is optionally applied to normalize $Q_{MU}$ to $\sqrt{N_{TX}}$.

When there are two user devices 206, one with a single antenna, and another with two antennas (as shown in FIG. 2), the inputs are the normalized vectors $V_1$ ($N_{TX} \times 2$) and $V_2$ ($N_{TX} \times 1$) and a diagonal matrix $D_1$ (2×2). Because $D_2$ is a scalar value, its value is not necessary for the computation of the precoding matrix. As before (for the case shown in FIG. 1), the nulling matrix for each receiver device is computed at 606 as:

$$Q_{Null1} = I - V_2 V_2^H$$

$$Q_{Null2} = I - V_1 V_1^H$$

where I is the identity matrix, and each nulling matrix $Q_{Null}$ has size ($N_{TX} \times N_{TX}$). Then, at 608, single user steering is performed to compute the precoding matrix based on the nulling matrix. In particular, a null channel matrix $H_{Null1}$ (with size ($2 \times N_{TX}$)) is computed as the product of the diagonal matrix $D_1$, the Hermitian of the singular vector $V_1$, and the nulling matrix $Q_{Null1}$:

$$H_{Null1} = D_1 V_1^H Q_{Null1}$$

Furthermore, because one of the user devices has a single antenna, the null channel vector $h_{Null2}$ is computed as described above in the example for FIG. 1:

$$h_{Null2} = V_2^H Q_{Null2}$$

where $h_{Null2}$ has size ($1 \times N_{TX}$). Then, one precoding element of the precoding matrix is computed as:

$$Q_{MU1} = \alpha_1 Q_{Null1} V_{Null1}$$

where $V_{Null1}$ are the singular vectors of $H_{Null1}$, and $Q_{MU1}$ has size ($N_{TX} \times 2$). Furthermore, another precoding element of the precoding matrix is computed as described above in the example for FIG. 1:

$$Q_{MU2} = \alpha_2 Q_{Null2} h_{Null2}^H$$

where $\alpha_u$ is applied to normalize $Q_{MU}$ to $\sqrt{N_{TX}}$, and $Q_{MU2}$ has size ($N_{TX} \times 1$).

When there are two user devices 306, each with two antennas (as shown in FIG. 3), the inputs are the normalized vectors $V_1$ ($N_{TX} \times 2$) and $V_2$ ($N_{TX} \times 2$) and the diagonal matrices $D_1$ (2×2) and $D_2$ (2×2). As described above, the nulling matrices $Q_{Null1}$ ($N_{TX} \times N_{TX}$) and $Q_{Null2}$ ($N_{TX} \times N_{TX}$) are generated at 606 according to:

$$Q_{Null1} = I - V_2 V_2^H$$

$$Q_{Null2} = I - V_1 V_1^H$$

Then two null channel matrices are computed as:

$$H_{Null1} = D_1 V_1^H Q_{Null1}$$

$$H_{Null2} = D_2 V_2^H Q_{Null2}$$

where $H_{Null1}$ has size ($2 \times N_{TX}$), and $H_{Null2}$ has size ($2 \times N_{TX}$). Then, at 608, the precoding elements of a precoding matrix are set to:

$$Q_{MU1} = \alpha_1 Q_{Null1} V_{Null1}$$

$$Q_{MU2} = \alpha_2 Q_{Null2} V_{Null2}$$

where $V_{Null1}$ are the singular vectors of $H_{Null1}$, $V_{Null2}$ are the singular vectors of $H_{Null2}$, and $\alpha_u$ is applied to normalize $Q_{MU}$ to $\sqrt{N_{TX}}$. Each of the precoding elements $Q_{MU1}$ and $Q_{MU2}$ have size ($N_{TX} \times 2$).

Alternatively, if it is determined at 604 that there are more than a threshold number of user devices 106 or when there are more than a threshold number of antennas across all the user devices 106, a process called transmit zero forcing may be used to determine the precoding matrix $Q_{MU}$. In particular, process 600 may proceed to 610 to form a Hermitian matrix B, to 612 to compute the inverse of B, and to 614 to set the precoding matrix based on the channel matrix and the inverse of B.

If transmit zero forcing is determined to be the appropriate technique for computing a precoding matrix, process 600 proceeds to 610, 612, and 614 to execute a transmit zero forcing technique. At 610, a Hermitian matrix B is formed as $$B = HH^H$$

where $$H = \begin{bmatrix} H_1 \\ H_2 \\ \vdots \\ H_k \end{bmatrix}$$

At 612, the inverse of the Hermitian matrix B is computed or determined as $B^{-1} = (HH^H)^{-1}$, and at 614, the precoding matrix $Q_{MU}$ is set to the product of $H^H$ and $B^{-1}$, or $Q_{MU} = H^H (HH^H)^{-1}$, where $Q_{MU}$ has size ($N_{RX\_total} \times N_{RX\_total}$, where $N_{RX\_total}$ is the total number of receiver antennas). The precoding matrix is set in this way such that $HQ_{MU} = I$. While matrix inversion is typically computationally expensive and complex, simple inversion techniques may be used by matrix computation circuitry 434 when using a Hermitian matrix B that has size (2×2), (3×3), or (4×4). In particular, a Hermitian matrix has properties of having real values on the diagonal, and symmetric off-diagonal values (where the values in the lower triangle values are symmetric to values in the upper triangle).

In an example, when B has size (4×4), a (4×4) transform matrix L is written as:

$$L = \begin{bmatrix} 1 & 0 & 0 & 0 \\ -\frac{b_{21}}{b_{11}} & 1 & 0 & 0 \\ -\frac{b_{31}}{b_{11}} & 0 & 1 & 0 \\ -\frac{b_{41}}{b_{11}} & 0 & 0 & 1 \end{bmatrix} = \begin{bmatrix} 1 & 0 & 0 & 0 \\ l_{21} & 1 & 0 & 0 \\ l_{31} & 0 & 1 & 0 \\ l_{41} & 0 & 0 & 1 \end{bmatrix}.$$

The transform matrix L is used for block diagonalizing the Hermitian matrix B by deriving the (4×4) matrix A generated according to:

$$A = LBL^H = \begin{bmatrix} b_{11} & 0^T \\ 0 & A_3 \end{bmatrix}$$

where $A_3$ is a (3×3) Hermitian matrix:

$$A_3 = \begin{bmatrix} b_{22} - \frac{\|b_{21}\|^2}{b_{11}} & [A_3]_{21}^* & [A_3]_{31}^* \\ b_{32} - \frac{b_{31}b_{21}^*}{b_{11}} & b_{33} - \frac{\|b_{31}\|^2}{b_{11}} & [A_3]_{32}^* \\ b_{42} - \frac{b_{41}b_{21}^*}{b_{11}} & b_{43} - \frac{b_{41}b_{31}^*}{b_{11}} & b_{44} - \frac{\|b_{41}\|^2}{b_{11}} \end{bmatrix} = \begin{bmatrix} a_{11} & a_{21}^* & a_{31}^* \\ a_{21} & a_{22} & a_{32}^* \\ a_{31} & a_{32} & a_{33} \end{bmatrix}$$

The inverse of a (3×3) Hermitian matrix $A_3$ (which is also a Hermitian matrix) has a closed-form solution:

$$A_3^{-1} = \begin{bmatrix} a_{33}a_{22} - \|a_{32}\|^2 & [A_3^{-1}]_{21}^* & [A_3^{-1}]_{31}^* \\ a_{31}a_{32}^* - a_{33}a_{21} & a_{33}a_{11} - \|a_{31}\|^2 & [A_3^{-1}]_{32}^* \\ a_{32}a_{21} - a_{31}a_{22} & a_{31}a_{21}^* - a_{32}a_{11} & a_{22}a_{11} - \|a_{21}\|^2 \end{bmatrix}$$

$$= \begin{bmatrix} m_{11} & m_{21}^* & m_{31}^* \\ m_{21} & m_{22} & m_{32}^* \\ m_{31} & m_{32} & m_{33} \end{bmatrix}$$

The inverse of B may then be written by computing a value c as:

$$c = a_{11}a_{22}a_{33} + 2Re[a_{21}^* a_{31} a_{32}^*] - a_{11}\|a_{32}\|^2 - a_{22}\|a_{31}\|^2 - a_{33}\|a_{21}\|^2$$

Then, the inverse of the (4×4) matrix A is written as:

$$A^{-1} = \begin{bmatrix} \frac{c}{b_{11}} & 0^T \\ 0 & A_3^{-1} \end{bmatrix} = \begin{bmatrix} m_0 & 0^T \\ 0 & [m_{ij}]_{i=1\ldots3, j=1\ldots3} \end{bmatrix}$$

Finally, the inverse of the (4×4) matrix B is written as:

$$B^{-1} = L^H A^{-1} L = \begin{bmatrix} x_{11} & x_{21}^* & x_{31}^* & x_{41}^* \\ x_{21} & m_{11} & m_{21}^* & m_{31}^* \\ x_{31} & m_{21} & m_{22} & m_{32}^* \\ x_{41} & m_{31} & m_{32} & m_{33} \end{bmatrix}$$

where $x_{21} = m_{11}l_{21} + m_{21}^* l_{31} + m_{31}^* l_{41}$ $x_{31} = m_{21}l_{21} + m_{22}l_{31} + m_{32}^* l_{41}$ $x_{41} = m_{31}l_{21} + m_{32}l_{31} + m_{33}l_{41}$ $x_{11} = Re[m_0 + x_{21}^* l_{21} + x_{31}^* l_{31} x_{41}^* l_{41}]$ In a simpler example, when B has size (3×3) the inverse of B has the simple closed form solution:

$$B^{-1} = \begin{bmatrix} b_{33}b_{22} - \|b_{32}\|^2 & [B^{-1}]_{21}^* & [B^{-1}]_{31}^* \\ b_{31}b_{32}^* - b_{33}b_{21} & b_{33}b_{11} - \|b_{31}\|^2 & [B^{-1}]_{32}^* \\ b_{32}b_{21} - b_{31}b_{22} & b_{31}b_{21}^* - b_{32}b_{11} & b_{22}b_{11} - \|b_{21}\|^2 \end{bmatrix}$$

In an even simpler example, if B is (2×2), the inverse of B has the simple closed form solution:

$$B^{-1} = \begin{bmatrix} b_{22} & -b_{12} \\ -b_{21} & b_{11} \end{bmatrix}$$

After B is inverted at 612, process 600 proceeds to 614, where the precoding matrix computation circuitry 436 computes the precoding matrix $Q_{MU}$ based on the Hermitian of the channel matrix and the inverse of B:

$$Q_{MU} = H^H B^{-1}$$

After the precoding matrix $Q_{MU}$ is computed, column-wise normalization may be performed by updating $Q_{MU}$ by:

$$Q_{MU} = Q_{MU} \text{diag}(\beta_i)$$

The purpose of performing column-wise normalization is to normalize the stream power for circuit design purposes. In some implementations, $\beta_i$ is a normalization factor that may be used to perform column-wise normalization. Then, the final multi-user precoders are $Q_1 = Q_{MU}(:,1:N_{R1})$, $Q_2 = Q_{MU}(:,N_{R1}+1:N_{R1}+N_{R2})$, ..., where $N_{R1}$ is a number of receive antennas on the first user device and $N_{R1}$ is a number of receive antennas on the second user device.

Figure 7:
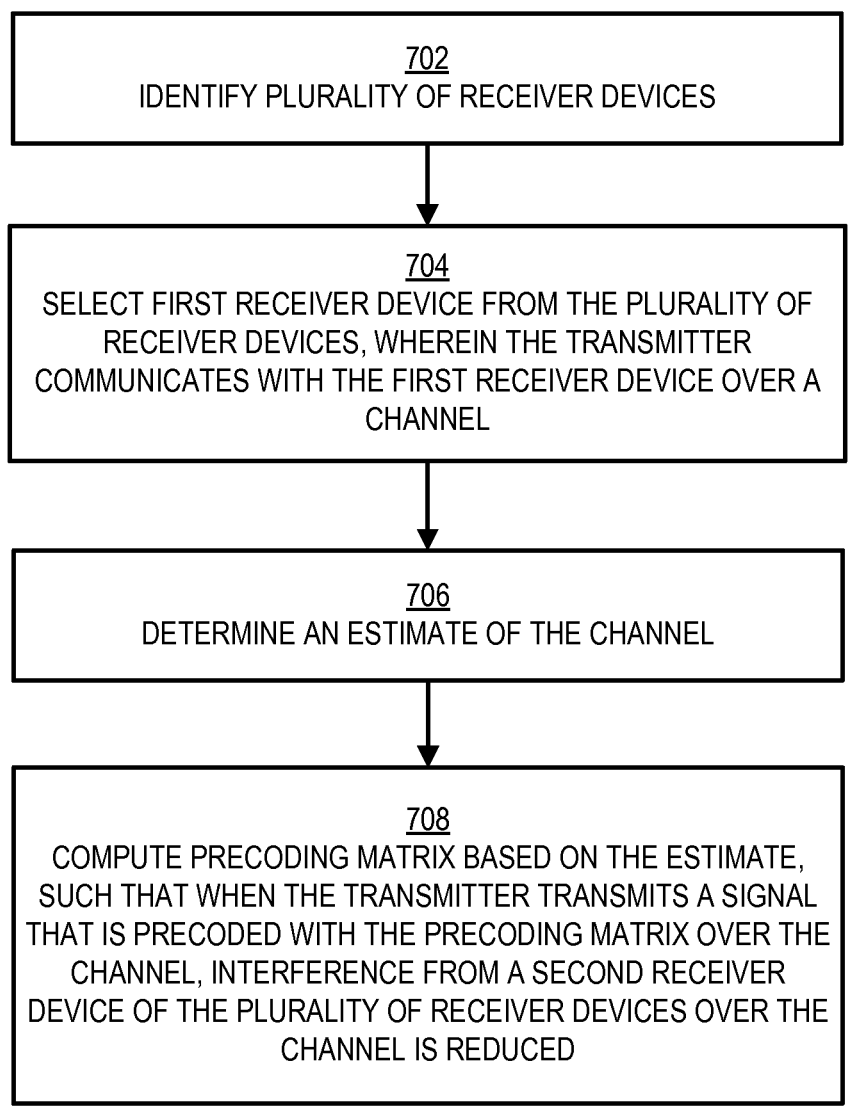
FIG. 7 illustrates a process for computing a precoding matrix, according to an embodiment of the present disclosure.

FIG. 7 shows a flow diagram of a process 700 for computing a precoding matrix, in accordance with an embodiment of the disclosure. Process 700 includes identifying plurality of receiver devices (702), selecting a first receiver device from the plurality of receiver devices, wherein the transmitter communicates with the first receiver device over a channel (704), and determining an estimate of the channel (706). Then, a precoding matrix is computed based on the estimate, such that when the transmitter transmits a signal that is precoded with the precoding matrix over the channel, interference from a second receiver device of the plurality of receiver devices over the channel is reduced (708).

At 702, a plurality of receiver devices are identified. In particular, transmitter 102 may identify a number of user devices 106, 206, or 306 with which transmitter 102 is configured to communicate. The number of devices in the plurality of receiver devices may be dependent on a number of active devices. For example, one or more of the receiver devices with which transmitter 102 is configured to communicate may be inactivated, and so the inactive receiver devices may not be included in the identified plurality of receiver devices. In addition, transmitter 102 may identify a total number of receive antennas on the receiver devices.

At 704, a first receiver device is selected from the plurality of receiver devices. The transmitter communicates with the first receiver device (i.e., user device 106a) over a channel (i.e., channel 112a). At 706, an estimate of the channel is determined. As described above, the channel may be estimated by a receiving device and directly fed back to transmitter 102. Alternatively, a receiving device may transmit other vectors and matrices, such as singular vectors ($V_k$) and singular values ($D_k$) for a channel k, to transmitter 102, which may then estimate the channel matrix from the received values.

At 708, a precoding matrix is computed based on the estimate of the channel. The precoding matrix is computed such that when the transmitter transmits a signal that is precoded with the precoding matrix over the channel, interference from a second receiver device of the plurality of receiver devices over the channel is reduced. As described herein, the precoding matrix may be computed such that the signal that is intended for the first receiving device is transmitted in such a way that a net effect of the remaining receiving devices is reduced over the channel. In an example, a first receiving device is associated with a first channel, and a second receiving device is associated with a second channel. In this case, the precoding matrix may be based on a projection of a first channel vector to the null space of a second channel vector. Thus, the second receiving device cannot interfere with the transmitted signal intended for the first receiving device. Similarly, the precoding matrix may be based on a projection of a second channel vector to the null space of the first channel vector. In this case, the first receiving device cannot interfere with the transmitted signal intended for the second receiving device. Projecting one channel vector onto the null space of another channel vector is referred to as nulling.

In more complex systems (with more than two user devices, for example), transmit zero forcing may be used to compute a precoding matrix. In transmit zero forcing, the result of the precoding is that the transmitted signals are orthogonalized between any two receiving devices. In particular, a Hermitian matrix is formed based on the estimates of the channels between the transmitter and the multiple receiving devices. As described in relation to FIG. 6, the precoding matrix is set to the product of the Hermitian of the channel matrix and the inverse of the Hermitian matrix. 37252141_1

Figure 8:
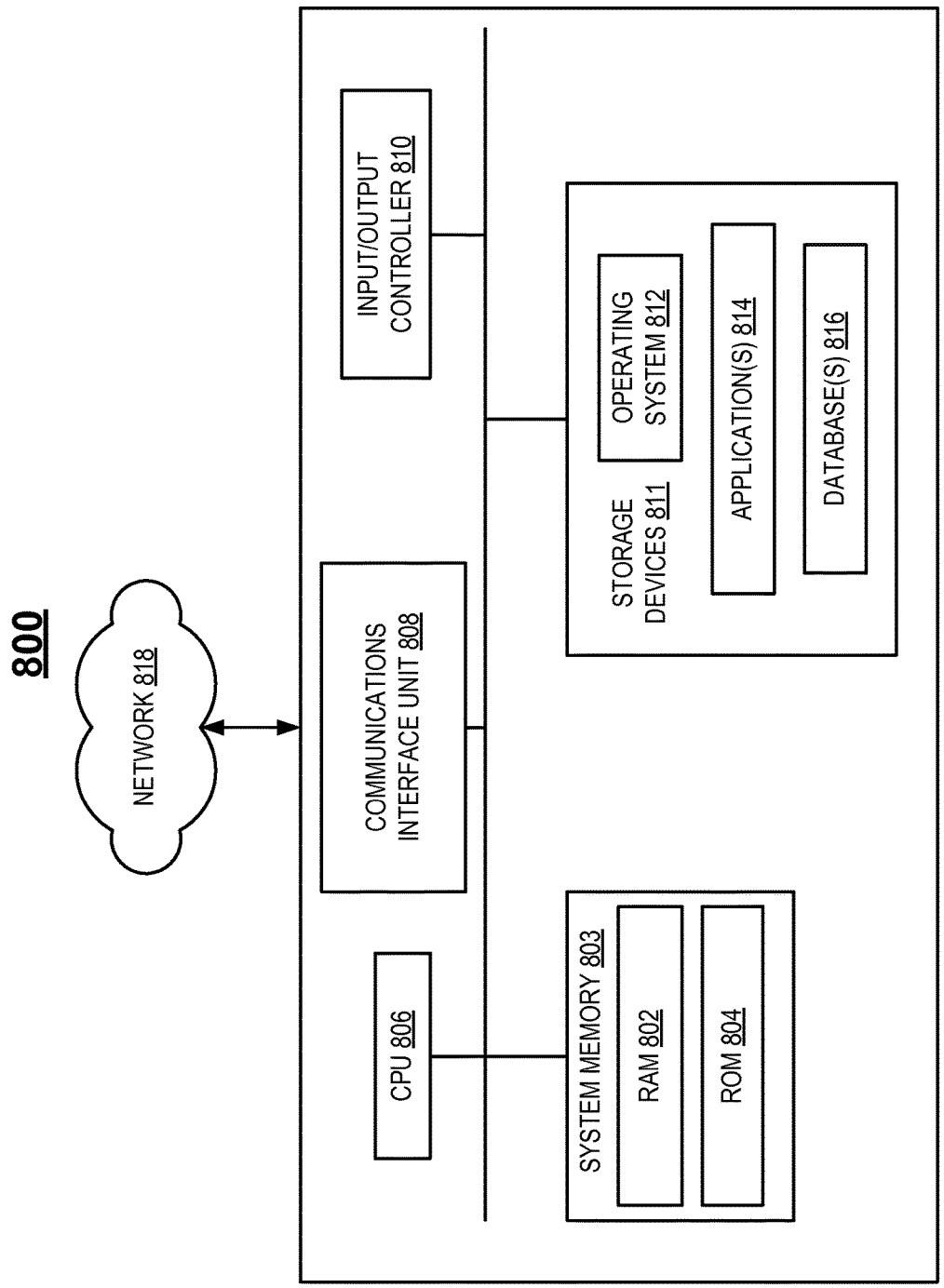
FIG. 8 is a block diagram of a computing device for performing any of the processes described herein, according to an embodiment of the present disclosure.

FIG. 8 shows a block diagram of a computing device, such as any of the components of the systems of FIGS. 1-4, for performing any of the processes described herein, in accordance with an embodiment of the disclosure. Each of the components of these systems may be implemented on one or more computing devices 800. In certain aspects, a plurality of the components of these systems may be included within one computing device 800. In certain embodiments, a component and a storage device 811 may be implemented across several computing devices 800.

The computing device 800 comprises at least one communications interface unit 808, an input/output controller 810, system memory 803, and one or more data storage devices 811. The system memory 803 includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network 818 or local network, to other servers or systems.

The computing device 800 may be configured in a distributed architecture, wherein databases and processors are housed in separate units or locations. Some units perform primary processing functions and contain at a minimum a general controller or a processor and a system memory 803. In distributed architecture embodiments, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device 811. The data storage device 811 may comprise an appropriate combination of magnetic, optical or semiconductor memory, and may include, for example, RAM 802, ROM 804, flash drive, an optical disc such as a compact disc or a hard disk or drive. The CPU 806 and the data storage device 811 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device 811 via the communications interface unit 808. The CPU 806 may be configured to perform one or more particular processing functions.

The data storage device 811 may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device 811, such as from the ROM 804 or from the RAM 802. While execution of sequences of instructions in the program causes the CPU 806 to perform the process steps described herein, hardwired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to determining a precoding matrix for a MUMIMO system as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for precoding a signal at a transmitter, the method comprising:
   identifying a plurality of receiver devices and at least one of a first number count of receiver devices in the plurality of receiver devices and a second number count of antennas associated with the plurality of receiver devices;
   selecting a first receiver device from the plurality of receiver devices, wherein the transmitter communicates with the first receiver device over a channel;
   determining an estimate of the channel;
   comparing, via a precoder at the transmitter, the first number count of receiver devices to a first threshold and the second number count of antennas to a second threshold;
   computing, via the precoder at the transmitter, when the first number count of receiver devices is above the first threshold or the second number count of antennas is above the second threshold, a precoding matrix of a second type based on the estimate of the channel;
   computing, via the precoder at the transmitter, otherwise, a precoding matrix of a first type, different from the second type, based on the estimate of the channel;
   encoding a signal that is precoded with at least one of the precoding matrix of the first type and the second type to reduce interference from a second receiver device of the plurality of receiver devices; and
   transmitting, from the transmitter, the encoded signal over the channel to the selected first receiver device.

2. The method of claim 1, wherein the estimate is a channel matrix, and the interference is reduced when a summation of the channel matrix multiplied by elements of the precoding matrix corresponding to a remainder of the plurality of receiver devices is zero, wherein the remainder includes the second receiver device.

3. The method of claim 1, wherein each element in the precoding matrix corresponds to a receiver device in the plurality of receiver devices.

4. The method of claim 1, wherein a nulling process is used to compute the precoding matrix of the first type when the first number count of receiver devices is less than or equal to the first threshold of two.

5. The method of claim 1, wherein a transmit zero forcing process is used to compute the precoding matrix of the second type when the first number count of receiver devices is more than the first threshold of two.

6. The method of claim 1, wherein the channel is a first channel, and wherein the transmitter communicates with the second receiver device over a second channel, and the precoding matrix is computed such that when the transmitter transmits a signal that is precoded with the precoding matrix over the second channel, interference from the first receiver device over the second channel is reduced.

7. The method of claim 1, further comprising:
   computing the precoding matrix of the first type comprises computing a nulling matrix for each receiver device in the plurality of receiver devices; and
   computing the precoding matrix of the second type comprises forming a Hermitian matrix based on the estimate of the channel.

8. The method of claim 1, wherein the signal is a first signal, and wherein determining the estimate of the channel further comprises receiving a second signal from the first receiver device.

9. The method of claim 4, wherein the nulling process comprises:
   computing a projection matrix of a second receiver device, wherein the projection matrix is orthogonal to a channel matrix associated with the second receiver device;
   computing a nulling matrix for the channel based on the projection matrix;
   computing a null channel matrix for the channel based on the nulling matrix; and
   computing an element of the precoding matrix of the first type based on the nulling matrix and the null channel matrix.

10. The method of claim 4, wherein the nulling process comprises:
    computing a nulling matrix by taking the difference between an identity matrix and a projection matrix of a second receiver device.

11. The method of claim 5, wherein the transmit zero forcing process comprises:
    forming an overall channel matrix, each portion of the overall channel matrix corresponding to a channel matrix associated with a receiver device in the plurality of receiver devices; and
    computing a Hermitian matrix by multiplying the overall channel matrix by a Hermitian of the overall channel matrix.

12. A system for precoding a signal at a transmitter, the system comprising:
    a precoding process selector located within a transmitter, configured to identify a plurality of receiver devices and at least one of a first number count of receiver devices in the plurality of receiver devices and a second number count of antennas associated with the plurality of receiver devices, and to select a first receiver device from the plurality of receiver devices, wherein the transmitter communicates with the first receiver device over a channel;

a precoder located within a transmitter, configured to:

determine an estimate of the channel, compare the first number count of receiver devices to a first threshold and a second number count of antennas to a second threshold, compute, when the first number count of receiver devices is above the first threshold or the second number count of antennas is above the second threshold, a precoding matrix of a second type based on the estimate of the channel, compute, otherwise, a precoding matrix of a first type, different from the second type, based on the estimate of the channel, encode a signal that is precoded with at least one of the precoding matrix of the first type and the second type to reduce interference from a second receiver device of the plurality of receiver devices; and transmission circuitry configured to transmit, from the transmitter, the encoded signal over the channel to the selected first receiver device.

13. The system of claim 12, wherein the estimate is a channel matrix, and the interference is reduced when a summation of the channel matrix multiplied by elements of the precoding matrix corresponding to a remainder of the plurality of receiver devices is zero, wherein the remainder includes the second receiver device.

14. The system of claim 12, wherein each element in the precoding matrix corresponds to a receiver device in the plurality of receiver devices.

15. The system of claim 12, wherein a nulling process is used to compute the precoding matrix of the first type when the first number count of receiver devices is less than or equal to the first threshold of two.

16. The system of claim 12, wherein a transmit zero forcing process is used to compute the precoding matrix of the second type when the first number count of receiver devices is more than the first threshold of two.

17. The system of claim 12, wherein the channel is a first channel, and wherein the transmitter communicates with the second receiver device over a second channel, and the precoding matrix is computed such that when the transmitter transmits a signal that is precoded with the precoding matrix over the second channel, interference from the first receiver device over the second channel is reduced.

18. The system of claim 12, wherein the precoder is further configured to:

compute the precoding matrix of the first type is further configured to compute a nulling matrix for each receiver device in the plurality of receiver devices; and compute the precoding matrix of the second type is further configured to form a Hermitian matrix based on the estimate of the channel.

19. The system of claim 12, wherein the signal is a first signal, and wherein the processor configured to determine the estimate of the channel further is further configured to receive a second signal from the first receiver device.

20. The system of claim 15, wherein the nulling process comprises:

computing a projection matrix of a second receiver device, wherein the projection matrix is orthogonal to a channel matrix associated with the second receiver device;

computing a nulling matrix for the channel based on the projection matrix;

computing a null channel matrix for the channel based on the nulling matrix; and computing an element of the precoding matrix of the first type based on the nulling matrix and the null channel matrix.

21. The system of claim 15, wherein the nulling process comprises:

computing a nulling matrix by taking the difference between an identity matrix and a projection matrix of a second receiver device.

22. The system of claim 16, wherein the transmit zero forcing process comprises:

forming an overall channel matrix, each portion of the overall channel matrix corresponding to a channel matrix associated with a receiver device in the plurality of receiver devices; and computing a Hermitian matrix by multiplying the overall channel matrix by a Hermitian of the overall channel matrix.

* * * * *